United States Patent

Chancellor

(10) Patent No.: US 6,692,621 B1
(45) Date of Patent: Feb. 17, 2004

(54) APPARATUS FOR HYDROGEN PRODUCTION

(75) Inventor: Dennis Chancellor, Falls of Rough, KY (US)

(73) Assignee: Nate International, Woodland Hills, CA (US)

( * ) Notice: Subject to any disclaimer, the term of this patent is extended or adjusted under 35 U.S.C. 154(b) by 56 days.

(21) Appl. No.: 09/979,973

(22) PCT Filed: Jul. 27, 2000

(86) PCT No.: PCT/US00/20537

§ 371 (c)(1),
(2), (4) Date: Jun. 4, 2002

(87) PCT Pub. No.: WO01/09408

PCT Pub. Date: Feb. 8, 2001

Related U.S. Application Data

(60) Provisional application No. 60/146,311, filed on Jul. 28, 1999.

(51) Int. Cl.$^7$ .................................................. C25B 9/00
(52) U.S. Cl. .......................... 204/278; 204/266; 204/270
(58) Field of Search ................................. 204/266, 278, 204/270

(56) References Cited

U.S. PATENT DOCUMENTS

| | | | | |
|---|---|---|---|---|
| 721,068 | A | 2/1903 | McCarthy | 204/274 |
| 1,398,658 | A | 11/1921 | Vincent | 205/633 |
| 3,647,672 | A | 3/1972 | Mehandjiev | 204/284 |
| 4,490,232 | A | 12/1984 | Lapeyre | 204/278 |
| 4,564,458 | A * | 1/1986 | Burleson | 210/747 |
| 5,167,786 | A * | 12/1992 | Eberle | 204/228.2 |
| 5,690,797 | A * | 11/1997 | Harada et al. | 204/228.5 |
| 5,711,865 | A * | 1/1998 | Caesar | 204/228.2 |

* cited by examiner

*Primary Examiner*—Patrick Ryan
*Assistant Examiner*—Thomas H. Parsons
(74) *Attorney, Agent, or Firm*—Rutan & Tucker, LLP

(57) ABSTRACT

An electrolysis system (10) has a head portion (18) to a well casing (30). The head portion (18) has a hydrogen discharge (12), an oxygen discharge (12) and a water feed path (20) which is in fluid communication with an electrolyte reservoir (36) which is defined by the well casing (30). The oxygen discharge (14) is fluidly coupled to the oxygen conduit (38) and the hydrogen discharge (12) is fluidly coupled to the hydrogen conduit (40). An electrolyzer with the oxygen conduit 38) and hydrogen conduit (40). The electrolyzer is electronically coupled to an AC/DC converter (52) and may be fluidly coupled to an atomizer (50) and chemical collector (48).

11 Claims, 1 Drawing Sheet

APPARATUS FOR HYDROGEN PRODUCTION

This application claims the benefit of U.S. provisional application No. 60/146,311, filed Jul. 28, 1999, which is incorporated herein by reference in its entirety,

FIELD OF THE INVENTION

The field of the invention is electrolytic hydrogen production.

BACKGROUND OF THE INVENTION

Hydrogen exhibits many advantages as an alternative energy source, including high energy density, and environmentally neutral combustion or recombination with oxygen. Furthermore, hydrogen can be generated from water in a relatively simple process (e g., water electrolysis), with almost no undesirable byproducts. However, despite the conceptually simple generation of hydrogen by water electrolysis, the energy efficiency of water electrolysis remains often problematic, and many approaches have been developed to improve the electrolytic generation of hydrogen.

In one approach, water electrolysis is powered or assisted by electricity generated in photovoltaic cells. The use of photovoltaic cells is particularly attractive, because photovoltaic cells produce voltages and currents suitable for electro-dissociation of water in an environmentally neutral manner. However, industrial scale production of hydrogen supported by photovoltaic cells with current technology would require vast arrays of photovoltaic cells. Moreover, besides a significant space requirement, large arrays of photovoltaic cells would incur a considerable cost.

In another approach, the electrolyte in a water electrolysis cell is heated to achieve improved conductivity. Improved conductivity of the electrolyte generally allows passing higher currents through the electrodes, and thereby increases hydrogen production per electrolysis cell. However, the energy cost to heat the electrolyte often reduces the overall efficiency of the electrolytic process. Furthermore, the use of a heated electrolyte frequently poses various problems due to the chemically aggressive character of some heated electrolytes. Still further, both photovoltaic and thermally assisted electrolysis typically produce hydrogen gas at or near atmospheric pressure. Consequently, when hydrogen needs to be stored or transported, additional energy must be spent to compress or liquefy the produced hydrogen gas.

To circumvent at least some of the problems associated with compression or liquefaction of the hydrogen gas, Smith discloses in U.S. Pat. No. 4,530,744 hydrogen electrolysis under pressure, in which water is pumped into an electrolyzer at an elevated pressure (typically 45 bar), resulting in a compressed hydrogen stream and a compressed oxygen stream. Smith's hydrogen stream is subsequently liquefied by cooling the hydrogen stream via expansion of the compressed oxygen stream. However. Smith's process requires a considerable amount of energy to compress the water, which is only partially recovered by expanding the oxygen stream for the cooling process. Moreover. Smith's electrolyzer requires a pressure resistant configuration, demanding especially thick walls and gas tight joints due to the considerable pressure differences between the inside and the outside of the pressure electrolysis unit.

In order to reduce problems with the pressure differences between the inside and outside of a pressure electrolysis unit. Reynolds describes in U.S. Pat. No. 3,652,431 a submerged electrolyzer in which a submerged hydrogen and a submersed oxygen storage tank with open bottom portions are in fluid communication with an electrolyzer. The water pressure acting on the gases in the storage tanks in Reynold's configuration is balanced by the line pressure from a non-submerged pump that delivers the electrolyte to the submerged electrolyzer. Although Reynold's submerged electrolyzer solves various problems with pressure differences between the inside and outside of the pressure electrolyzer, various difficulties still remain. Most notably, considerable energy is required to counter balance the hydrostatic pressure on the submerged electroivzer by pumping the electrolyte into the electrolyzer. This will become especially problematic, when the pressure electrolyzer is submerged at a relatively great depth.

Various technologies are known in the art to improve energy efficiency of water electrolysis, however, all or almost all of them have several drawbacks. Therefore, there is still a need to provide methods and apparatus for improved hydrogen production.

SUMMARY OF THE INVENTION

The present invention is directed to an apparatus with a housing at least partially filled with an electrolyte, and a pair of electrodes (i.e., an anode and a cathode) disposed within the electrolyte to split the electrolyte into a first and a second product gas when a voltage is applied.

Both electrodes are disposed in the electrolyte at a depth sufficient for a reduction in electrolyzing energy of greater or equal than 10%. It is generally preferred that the housing is disposed in, or part of, a deep well, or below the surface of a body of water.

In one aspect of the inventive subject matter, the electrolyte comprises water, preferably purified water, and even more preferably deionized water from a reverse osmosis unit. Consequently, a preferred first product gas is hydrogen and a preferred second product gas is oxygen.

In another aspect of the inventive subject matter, the depth at which the electrodes are disposed at is between 300 and 500 meters, and preferably between 500 and 1,000 meters, however depths greater than 1,000 meters are also contemplated.

Various objects, features, aspects and advantages of the present invention will become more apparent from the following detailed description of preferred embodiments of the invention, along with the accompanying drawing.

DETAILED DESCRIPTION

Figure 1:
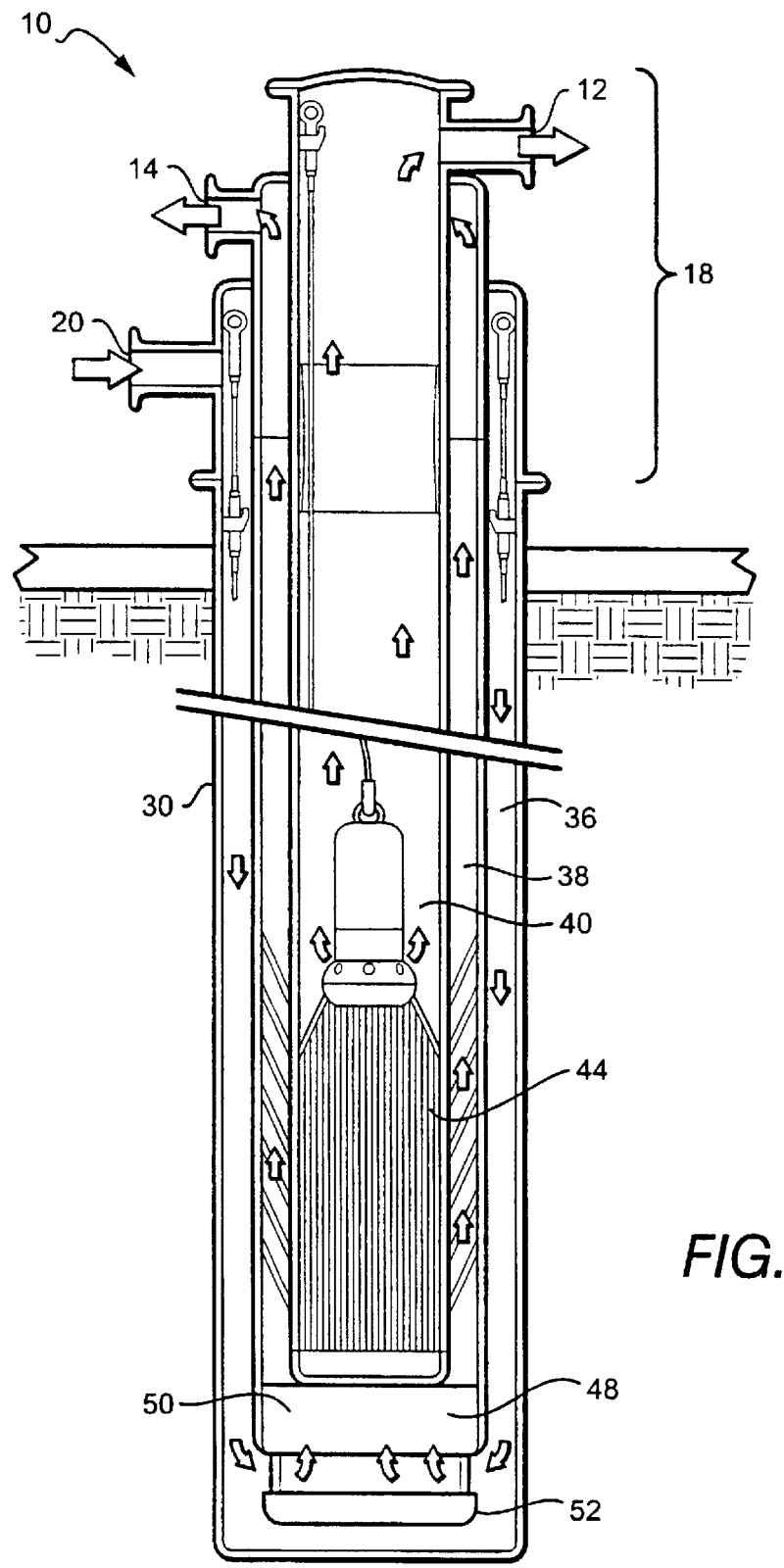
FIG. 1 is a schematic vertical cross sectional view of an electrolysis apparatus according to the inventive subject matter.

An electrolysis system generally comprises a housing that is at least partially filled with an electrolyte. An anode and a cathode are disposed within the electrolyte and electrolytically disintegrate the electrolyte into at least a first product and a second product when a voltage is applied across the electrodes. Both anode and cathode are located in the electrolyte at a depth sufficient for a reduction in an electrolyzing energy of greater or equal than 10%.

An exemplary electrolysis system 10 is shown in FIG. 1 having a head portion 18 operationally coupled to a well casing 30. The head portion 18 has a hydrogen discharge 12, an oxygen discharge 14, and a water feed path 20 is in fluid communication with the electrolyte reservoir 36, which is defined by the well casing 30. The oxygen discharge 14 is fluidly coupled to the oxygen conduit 38, and the hydrogen discharge 12 is fluidly coupled to the hydrogen conduit 40. An electrolyzer 44 with a plurality of electrodes (i.e., cathodes and anodes—not explicitly shown) is disposed within the electrolyte reservoir 36 and in fluid communication with the oxygen conduit 38 and hydrogen conduit 40. The electrolyzer 44 is electrically coupled to an AC/DC converter 52, and may further be fluidly coupled to an atomizer 50 and a chemical collector 48.

It is generally contemplated that at least part of the electrolysis system is in a location below a surface normal to an operator of the electrolysis system (e.g. below ground or below sea level). In a preferred aspect of the inventive subject matter, a predominant portion (i.e., more than 90%) of the height of the electrolysis system is below the ground, and particularly preferred locations include natural and man-made subterranean cavities such as a bore hole, a deep well, a mine-shaft, or a cavity formed by geological events (e.g., erosion or volcanic activity). Alternatively, contemplated electrolysis systems need not necessarily be limited to a subterranean location. For example, alternative electrolysis systems may be partially or entirely located on the surface of a natural or man-made slanted structure, including a hill or mountainside. In another example, contemplated electrolysis systems may be partially or entirely immersed in a body of water, including a lake or an ocean.

With respect to the housing, it is contemplated that the housing may be a natural or man-made structure. For example, the housing may be formed from a well casing, which forms an electrolyte reservoir. Dedicated well casings are especially desirable, where leakage of the electrolyte would otherwise pose a significant problem, or where leaching of minerals or other substances would be detrimental to the composition of the electrolyte. Moreover, a well casing may prevent microbial growth in the electrolyte. Alternatively, an existing cavity may be covered with a sealant or other coating to form the housing. On the other hand, where the electrolysis system is disposed in a man-made borehole in a geological formation substantially impervious and inert to the electrolyte, the housing is formed by the borehole and a well casing or coating may be omitted altogether.

In a particularly preferred aspect of the inventive subject matter, a housing is formed from multiple, cylindrical elements (e.g., fabricated from stainless steel) with a diameter sufficiently wide to accommodate the electrolyzer, the hydrogen conduit and the oxygen conduit, and it is even more preferred that the housing is gradually assembled above ground as the nascent housing is deployed below the ground. However, it should be appreciated that the shape of appropriate housings need not be limited to a cylindrical shape, so long as alternative shapes still accommodate the electrolyzer, the hydrogen conduit and the oxygen conduit. For example, suitable, shapes include triangular, rectangular, polygonal and irregularly shaped configurations.

With respect to the size of the housing, it is generally contemplated that suitable housings extend in their longest dimension at least 300 meters, more preferably at least between 300 and 500 meters, or more, including 500 to 1,000 meters and more. Appropriate diameters of the housing are typically between less than 1 meter and 15 meters, however, diameters larger than 15 meters are also contemplated. For example, where the housing is formed by a mineshaft or geological formation, suitable diameters may be 15 to 50 meters in diameter and more.

In another aspect of the inventive subject matter, the electrolyte comprises predominantly water, preferably freshwater, which may or may not be pretreated. The term "pretreated" as used herein refers to a physical or chemical process that alters (typically reduces) the concentration of gases, ionic, particulate, organic or inorganic matter. For example, filtered, ion-exchanged, irradiated, or ozonized water is considered pretreated under the scope of this definition, and a particularly preferred pretreatment of water comprises degassing, and reverse osmosis. It should be especially appreciated, that where ultra filtered (e.g., by reverse osmosis) and deionized water is employed as the electrolyte, salts or other ionic species (e.g., $OH^-$, $H^+$, organic acids or bases) may be added to increase electric conductivity of the electrolyte. Thus, contemplated electrolytes may include treated and untreated sea water, treated and untreated fresh water, or other treated and untreated aqueous solutions such as processing fluids from industrial plants, sewage, etc. Consequently, where the electrolyte is predominantly water, the first product gas evolving at the cathode is hydrogen, while the second product gas evolving at the anode is oxygen.

It should further be appreciated that the anode and cathode (i.e., electrodes) need not be limited to a particular configuration or type. There are many electrode materials and configurations known in the art, all of which are contemplated for use in conjunction with the teachings presented herein, so long as contemplated electrodes are capable of electrolyzing water into hydrogen and oxygen, and have a configuration that withstands the hydrostatic pressure at the depth where the electrodes are disposed. For example, the electrodes may be coated with, or entirely be fabricated from one or more noble metals or their alloys. Furthermore, the configuration of appropriate electrodes may vary considerably. For example, one or both electrodes may be an integral part of the housing. Similarly, depending on the physico-chemical environment, the distance of the cathode and anode may vary between several millimeters and several centimeters, and more. The voltage applied across the electrodes will typically be a function of the electrolyte, the conductivity, the configuration of the electrodes, etc., and may therefore vary between 0.1V and 10V, and more. Moreover, where the electrode configuration includes a diaphragm, the nature and configuration of the diaphragm is not limiting to the inventive concept. For example, where appropriate, a polymeric or ceramic diaphragm may be employed.

With respect to the placement of the electrodes, it is contemplated that both the anode and the cathode are disposed within the electrolyte at a depth sufficient for a reduction in an electrolyzing energy of greater or equal than 10%. The term "electrolyzing energy" as used herein refers to the energy required to electrolytically split a compound (typically water) into two products (typically $H_2$ and $O_2$) at a pressure of no more than 1.1 bar (equivalent to about 1 meter depth in water). Thus, it is contemplated that depending on the particular physico-chemical properties of the electrolyte (e.g., salinity, temperature, etc.), the reduction of electrolyzing energy is at least 10% when the electrodes are placed at a depth between 300 and 500 meters. However, alternative depths are also contemplated, including depths between 500 and 1,000 meters, and more than 1,000 meters.

It should be especially appreciated that by placing the electrodes at a significant depth into the electrolyte, the hydrostatic pressure of the electrolyte provides at least in part the reduction in electrolyzing energy. While submersible electrolysis systems are known in the art, all of the known submersible electrolysis systems submerge the container with the electrolyte together with the electrodes, thereby inherently imposing various practical limitations on size, amount of electrolyte delivered, etc. In contrast, in the electrolytic system according to the inventive subject matter, only the electrodes are disposed at a great depth within a housing holding the electrolyte. It is not the housing itself, but only the electrodes within the housing that are submerged at a great depth.

It is still further contemplated that the product gas conduits (e.g., the liquid hydrogen conduit and the liquid oxygen conduit) are configured to withstand the internal pressure of the compressed product gases. There are numerous configurations for conduits for compressed gases known in the art, all of which are contemplated for use herein. In a particularly preferred configuration, it is contemplated that the conduits are formed by nested cylindrical elements that can easily be assembled and disassembled (i.e., extended and shortened) on the surface while lowering or retrieving the conduits from the housing (see also FIG. 1). It is further contemplated that in this configuration at least part of the anode and cathode are fluidly coupled to the hydrogen conduit and the oxygen conduit.

It is still further contemplated that the power delivered to the electrodes is preferably AC power, and where AC power is utilized to drive the electrolysis, an AC/DC converter is preferably in close proximity to the electrodes. Further additional elements functionally coupled to the electrodes may include an atomizer that would agitate the molecules of water, or possibly other solid or liquid catalysts utilized in the electrolysis process. Where chemical catalysts are concerned, a chemical collector may be provided as well.

It is particularly contemplated that a refrigeration unit may be operationally coupled to the housing, wherein the refrigeration unit utilizes the expansion energy of the compressed second product gas to cool and/or liquefy the compressed first product gas. A particularly suitable refrigeration system for the production of liquefied hydrogen employing compressed hydrogen gas and compressed oxygen gas is described in U. S. Pat. No. 4,530,744 to Smith, incorporated by reference herein. In yet another aspect of the inventive subject matter, the electrolysis system according to the inventive subject matter may be operationally coupled to a deep well reverse osmosis unit that feeds purified water to the electrodes. A typical deep well reverse osmosis unit is described, for example, in U.S. Pat. No. 5,914,014 to Chancellor. Where a deep well reverse osmosis unit is coupled to the electrolysis system, it is contemplated that the coupling may further, comprise an electrolyte make up system in which acid, base, or salts are admixed to the purified water.

Thus, specific embodiments and applications for hydrogen production have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

what is claimed is:

1. An apparatus, comprising:

a housing at least partially filled with an electrolyte;

an anode and a cathode disposed within the electrolyte, wherein the anode and the cathode electrolytically split the electrolyte into a first product and a second product when a voltage is applied across the anode and cathode; and wherein the anode and the cathode are disposed in the electrolyte at a depth sufficient for a reduction in an electrolyzing energy in an amount of greater than or equal to 10%.

2. The apparatus of claim 1 wherein at least part of the housing is disposed in a deep well.

3. The apparatus of claim 1 wherein at least part of the housing is disposed below a surface of a body of water.

4. The apparatus of claim 1 wherein the electrolyte comprises water.

5. The apparatus of claim 4 wherein the water is deionized.

6. The apparatus of claim 1 wherein the first product gas is hydrogen.

7. The apparatus of claim 1 wherein the first product gas is oxygen.

8. The apparatus of claim 1 wherein the depth is between 300 and 500 meters.

9. The apparatus of claim 1 wherein the depth is between 500 and 1,000 meters.

10. The apparatus of claim 1 wherein the depth is greater than 1,000 meters.

11. The apparatus of claim 1 wherein the apparatus is fluidly coupled to a reverse osmosis unit.

* * * * *